United States Patent [19]

Oshima et al.

[11] 4,324,152
[45] Apr. 13, 1982

[54] SEALING DEVICE FOR A MANUAL TRANSMISSION FOR AN AUTOMOBILE

[75] Inventors: Syoiti Oshima; Shuichiro Ida, both of Toyota, Japan

[73] Assignee: Toyota Jidosha Kogyo Kabushiki Kaisha, Toyota, Japan

[21] Appl. No.: 162,835

[22] Filed: Jun. 25, 1980

[30] Foreign Application Priority Data

Mar. 26, 1980 [JP] Japan .................. 55-40795[U]

[51] Int. Cl.³ .............. F16H 57/02; B60K 17/34; G05G 9/16
[52] U.S. Cl. .............. 74/606 R; 74/473 R; 180/247
[58] Field of Search .............. 74/473 R, 606 R; 180/247

[56] References Cited

U.S. PATENT DOCUMENTS 4,170,273 10/1979 Kodama et al. .............. 74/473 R X

FOREIGN PATENT DOCUMENTS

59858/73 3/1975 Australia.

Primary Examiner—Allan D. Herrmann
Attorney, Agent, or Firm—Oblon, Fisher, Spivak, McClelland & Maier

[57] ABSTRACT

Disclosed herein is a sealing device for a manual transmission for an automobile which has a transmission case, an extension housing, a case cover mounted to the transmission case, a shift lever retainer, a shift lever shiftably and selectively supported by the shift lever retainer and a shift lever shaft extending along the case cover and the shift lever retainer. The device comprises cylindrical connecting portions respectively formed in the case cover and the shift lever retainer and penetrated by the shift lever shaft and are connected with each other by insertion. A sealing member is interposed between the inner periphery of one of the connecting portions and the outer periphery of the other.

7 Claims, 6 Drawing Figures

SEALING DEVICE FOR A MANUAL TRANSMISSION FOR AN AUTOMOBILE

BACKGROUND OF THE INVENTION

1. Field of the Invention

The present invention relates to a manual transmission for an automobile, and more particularly, it relates to a manual transmission comprising a transmission case, an extension housing provided separately from the transmission case, a case cover for covering an open upper end of the transmission case, a shift lever retainer provided separately from the extension housing and mounted on the upper surface thereof and a shift lever shaft provided along the case cover and the shift lever retainer.

2. Description of the Prior Art

In general, the case cover and the shift lever retainer of a manual transmission for an automobile are connected with each other under a condition that dust seal is achieved in a portion through which the shift lever shaft passes to prevent exposure of the shaft. However, the case cover and the retainer are individually mounted on the transmission case and to the extension housing respectively, for improving sealing effectiveness of the junctions thereof. Consequently, the upper surface of the transmission case to which the case cover is mounted and the upper surface of the extension housing to which the retainer is mounted are not flushed with each other unless they are simultaneously worked, leading to inconformity in location of the connecting portions.

To overcome such a defect, a conventional manual transmission employs a dust boot made of elastic material such as rubber for sealing the connecting portions of the cover and the retainer to absorb the inconformity in location by deformation of the boot. However, the dust boot is difficult to assemble into the transmission since the same should be placed to cover the shift lever shaft and the outer peripheries of the connecting portions after connection of the case cover and the shift lever retainer and the space for working is limited. Further, the assembled dust boot tends to be displaced or broken by vibration to damage the sealing function on the connecting portions.

SUMMARY OF THE INVENTION

In consideration of the aforementioned disadvantages of the prior art, it is an object of the present invention to provide a manual transmission for an automobile which can easily connect the case cover of the transmission case and the shift lever retainer of the extension housing and which can maintain prolonged sealing function thereof.

It is another object of the present invention to provide a manual transmission for an automobile which is compact at the connecting portions with respect to the thrust direction, i.e., the longitudinal direction of the automobile.

According to the present invention, there is provided a manual transmission for an automobile in which the connecting portions of the case cover mounted to the transmission case and the shift lever shaft mounted to the extension housing are made in a cylindrical form respectively so that one is inserted into the other with interposition of a sealing member to maintain prolonged reliability of dust sealing function for the shift lever shaft extending along the case cover and the retainer through the connecting portions. According to the present invention, the connecting portions can be easily connected with each other by insertion of one into the other to simplify the construction thereof.

DESCRIPTION OF THE PREFERRED EMBODIMENTS

Figure 1:
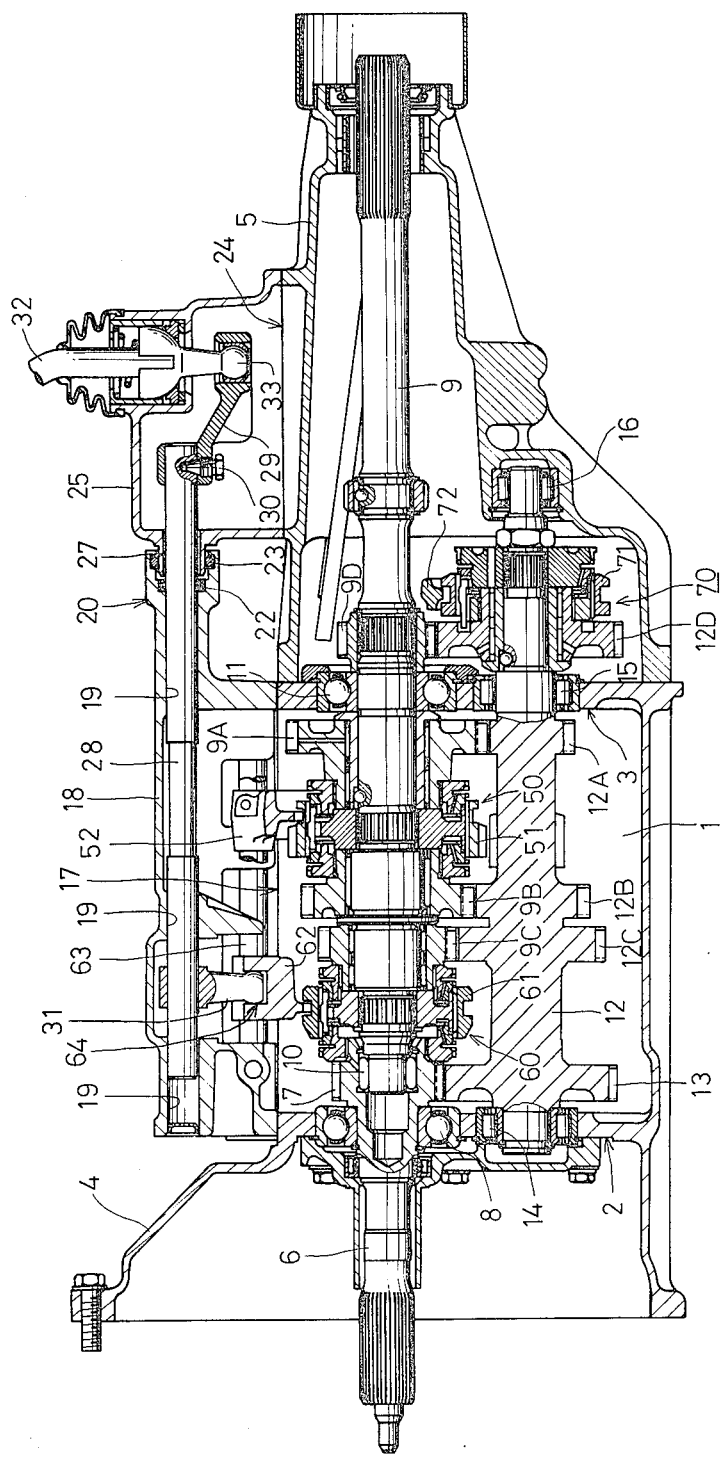
FIG. 1 is a longitudinal sectional view of a forward fivespeed manual transmission.

Referring now to FIG. 1 of the drawings in which a forward five-speed manual transmission according to the present invention is shown in section, a transmission case 1 is integrally provided in its front side with a clutch housing 4 and separately provided in its rear side with an extension housing 5. An input shaft 6 of the transmission is rotatably supported by a ball bearing 8 fitted in a front wall 2 of the transmission case 1. The front end of the shaft 6 as shown in the left-hand direction in FIG. 1 is relatively rotatably supported with respect to the end of a crank shaft of an engine (not shown) by a pilot bearing.

An output shaft 9 of the transmission is provided on axial extension of the input shaft 6, and extends from the interior of the transmission case 1 to the interior of the extension housing 5. The output shaft 9 is rotatably supported by a ball bearing 11 which is fitted in a rear wall 3 of the transmission case 1, and the front end thereof is relatively rotatably connected to the input shaft 6 by a needle roller bearing 10.

Under the input and the output shafts 6 and 9, a counter shaft 12 is provided in parallel therewith and is rotatably supported on the front wall 2 and the rear wall 3 of the transmission case 1 and the extension housing 5 by roller bearings 14, 15 and 16 respectively. A counter drive gear 13 integrally provided on the front end of the counter shaft 12 is always engaged with an input gear 7 integrally provided on the input shaft 6. The counter shaft 12 is further integrally provided in the portion within the transmission case 1 with first, second and third counter gears 12A to 12C in order from the rear side.

On the other hand, first, second and third transmission gears 9A to 9C are rotatably supported on the output shaft 9 within the transmission case 1 in order from the rear side. The transmission gears 9A to 9C are always engaged with the counter gears 12A to 12C at predetermined gear ratios. A small-diametrical fifth transmission gear 9D is provided on the output shaft 9 to integrally rotate therewith within the extension housing 5. The transmission gear 9D is always engaged with a large-diametrical fifth transmission gear 12D rotatably supported on the counter shaft 12 within the extension housing 5.

On the output shaft 9, further, there are provided between the first and the second transmission gears 9A and 9B and between the third transmission gear 9C and the input gear 7 of the input shaft 6 a first and second speed clutch mechanism 50 and a third and fourth speed clutch mechanism 60 employing conventional keytype synchromesh mechanisms respectively. On the counter shaft 12 within the extension housing 5, there is provided a fifth speed clutch mechanism 70. The first and second speed clutch mechanism 50 functions to connect the first transmission gear 9A or the second transmission gear 9B with the output shaft 9 for transmitting torque after synchronized rotation by horizontally sliding a clutch hub sleeve 51 following shifting movement of a shift fork 52.

In like manner, the third and fourth speed clutch mechanism 60 functions to connect the third transmission gear 9C or the input shaft 6 with the output shaft 9 for transmitting torque after synchronized rotation by sliding a clutch hub sleeve 61 following shifting movement of a shift fork 62. Further, the fifth speed clutch mechanism 70 on the counter shaft 12 functions to connect the fifth gear 12D with the counter shaft 12 after synchronized rotation by sliding a clutch hub sleeve 71 in the right-hand direction in FIG. 1 following shifting movement of a shift fork 72.

The upper end of the transmission case 1 is open at 17, and the open portion 17 is covered by a case cover 18. The junction between the open portion 17 and the case cover 18 is tightly sealed in consideration of the lubricating oil contained in the case 1, and the case cover 18 is secured to the case 1 by an appropriate number of bolts (not shown). Within the case cover 18, there is provided a shift lever shaft 28 which is in parallel with the input and the output shafts 6 and 9. The shift lever shaft 28 is supported at three portions, namely, at through-holes 19 formed in the front, the center and the rear portions of the case cover 18 so that it may be slidable in the axial direction and rotatable about the axis thereof.

Figure 2:
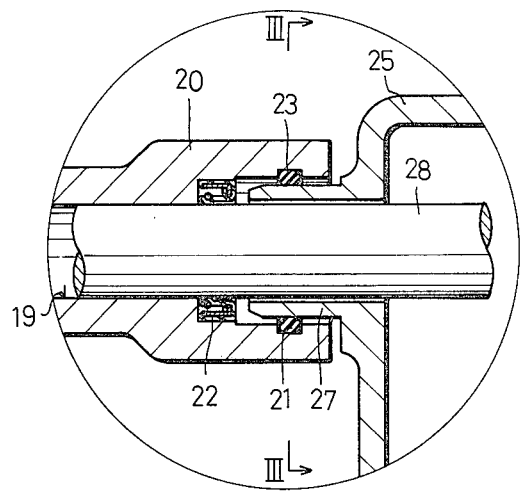
FIG. 2 is an enlarged view of a part of FIG. 1.
Figure 3:
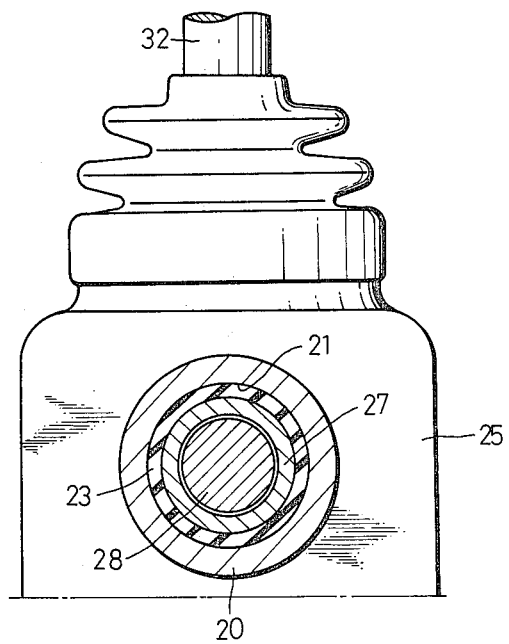
FIG. 3 is a cross sectional view taken along lines III—III of FIG. 2.

Around the rear through-hole 19 of the case cover 18, there is provided a large-diametrical cylindrical connecting portion 20 which is substantially coaxial with the central axis of the through-hole 19, i.e., the axis of the shift lever shaft 28 as shown in FIGS. 2 and 3. An oil seal 22 is inserted into the inner part of the connecting portion 20 for sealing the outer surface of the shift lever shaft 28. In the inner periphery of the connecting portion 20 in the vicinity of its open portion, there is provided an annular groove 21 which is U-shaped in section, into which a sealing member (O-ring) 23 is inserted for dust sealing function for the shift lever retainer side as hereinafter described.

The shift lever shaft 28 is integrally provided with a shift-and-select lever 31 within the transmission case 1 as shown in FIG. 1. The lever 31 is selectively engaged with a shift head secured to the fork shaft of each of the shift forks 52, 62 and 72 and a reverse shift fork (not shown) by selective rotation of the shaft 28 about its axis. In FIG. 1, for example, the lever 31 is selectively engaged with a shift head 64 secured to a fork shaft 63 of the third and fourth speed shift fork 62. When the shift lever shaft 28 is slidably shifted in its axial direction in this condition, the shift fork 62 and the fork shaft 63 are horizontally driven through the lever 31 so that the third speed or the fourth speed shift is obtained by function of the clutch mechanism 60 in response to the direction of movement of the shift fork 62. With respect to the other shift forks, the shifting operation thereof is conducted in the same way as the shift fork 62 as hereinabove described excepting that the fifth speed shift fork 72 and the reverse shift fork (not shown) are shifted only in one direction respectively.

As shown in FIG. 1, a shift lever retainer 25 is secured to the upper surface 24 of the extension housing 5 by an appropriate number of bolts (not shown). The shift lever retainer 25 is provided in a position corresponding to the connecting portion 20 of the case cover 18 with a cylindrical connecting portion 27 of which outer diameter is sized to be inserted into the connecting portion 20 of the case cover 18. Namely, the connecting portion 27 of the retainer 25 is inserted into the connecting portion 20 of the case cover 18 while pressing against the sealing member 23 and elastically deforming the same (see FIG. 2). In this condition, dust sealing between the connecting portions 20 and 27 is achieved by the sealing member 23. The sealing member 23 is made of elastic material such as rubber, and has deformation allowance in consideration of the maximum error at the time of assembling of the connecting portions 20 and 27. This error is caused by variation in finished size of the connecting portions 20 and 27 and in assembling accuracy of the case cover 18 and the retainer 25 with respect to the transmission case 1 and the extension housing 5.

The shift lever shaft 28 extends through the connecting portion 20 of the case cover 18 and the connecting portion 27 of the retainer 25 into the interior of the retainer 25, and is provided in its end with a shift lever housing 29 secured thereto by a bolt 30 as shown in FIG. 1. On the other hand, a shift lever 32 is spherically supported by the retainer 25 shiftably and selectively in a conventional manner, and a spherical portion 33 in the lower end thereof is connected to the shift lever housing 29 within the retainer 25. By virtue of this, the shift lever shaft 28 can be driven for rotation about its axis or sliding movement in the axial direction following selective operation or shifting operation of the shift lever 32 as hereinabove described.

By virtue of the aforementioned construction, the shift lever shaft 28 driven to slide along and rotate about its axis between the case cover 18 and the shift lever retainer 25 is securely held in a dust sealing condition at the connecting portions 20 and 27 by the sealing member 23. Since the sealing member 23 is assembled within the connecting portion 20, the sealing member 23 will not be displaced therefrom and maintains prolonged reliability of the sealing function.

Further, the sealing member 23 is inserted into the annular groove 21 of the connecting portion 20 before insertion of the other connecting portion 27 thereinto, for remarkably simplifying assembling operation in comparison with conventional sealing construction utilizing a dust boot. Since the connecting portion 27 in the retainer side is inserted into the connecting portion 20 in the cover side along the shift lever shaft 28, the retainer 25 is connected with the case cover 18 previous to connection of the shift lever housing 29 to the shift lever shaft 28 in this embodiment. With respect to this process, refer to the second embodiment as hereinafter described.

Figure 4:
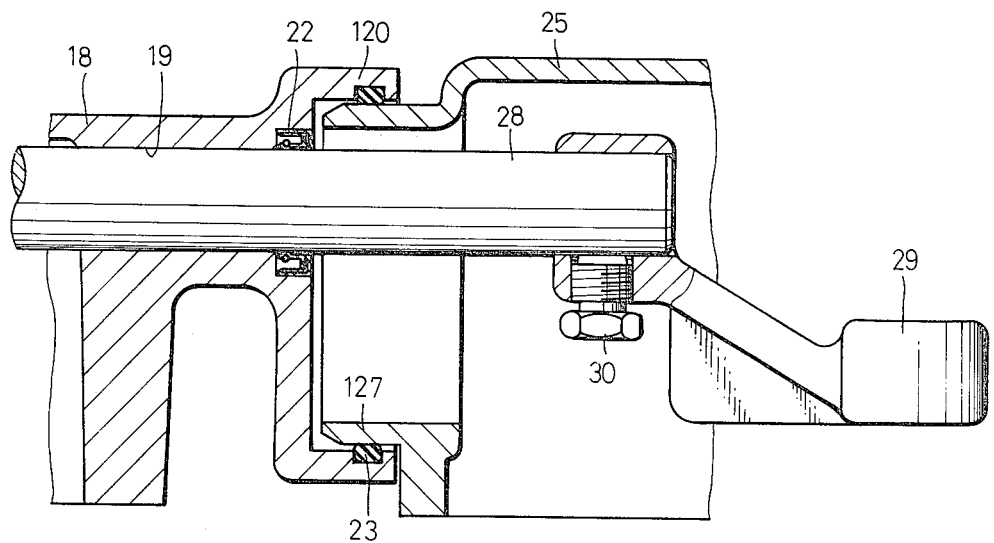
FIG. 4 is an enlarged longitudinal sectional view of a part of a second embodiment of the present invention.

FIG. 4 shows the second embodiment of the present invention in which assembly of the shift lever retainer 25 is taken into consideration for improving the connecting portions of the retainer 25 and the case cover 18. In this embodiment, connecting portions 120 and 127 are made large in diameter so that the connecting portion 127 in the retainer side can be inserted into the connecting portion 120 in the cover side along the shift lever shaft 28 without being obstructed by the shift lever housing 29 even if the same is previously mounted to the shaft 28. Thus, the retainer 25 can be connected to the case cover 18 after the case cover 18 is connected to the transmission case 1 and the shift lever housing 29 is mounted to the shift lever shaft 28 for simplifying assembling operation.

Figure 5:
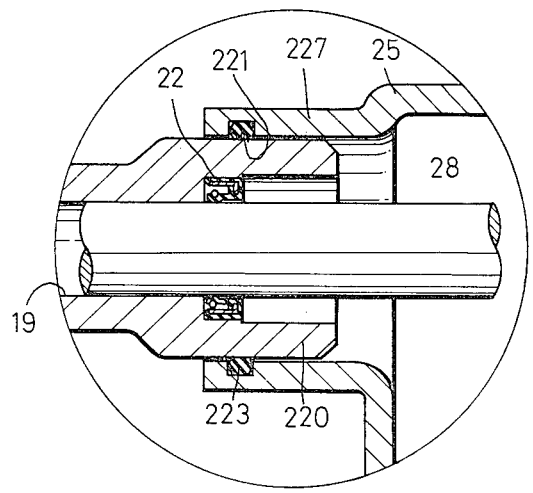
FIG. 5 is a longitudinal sectional view of a part of a third embodiment of the present invention.

In the third embodiment as shown in FIG. 5, a connecting portion 227 of the shift lever retainer 25 is made large in diameter to enclose the outer periphery of a connecting portion 220 of the case cover 18. In this embodiment, therefore, the connecting portion 220 in the retainer side is provided in its inner periphery with an annular groove 221 into which a sealing member 223 for pressing against the outer periphery of the connecting portion 220 in the cover side is inserted.

Figure 6:
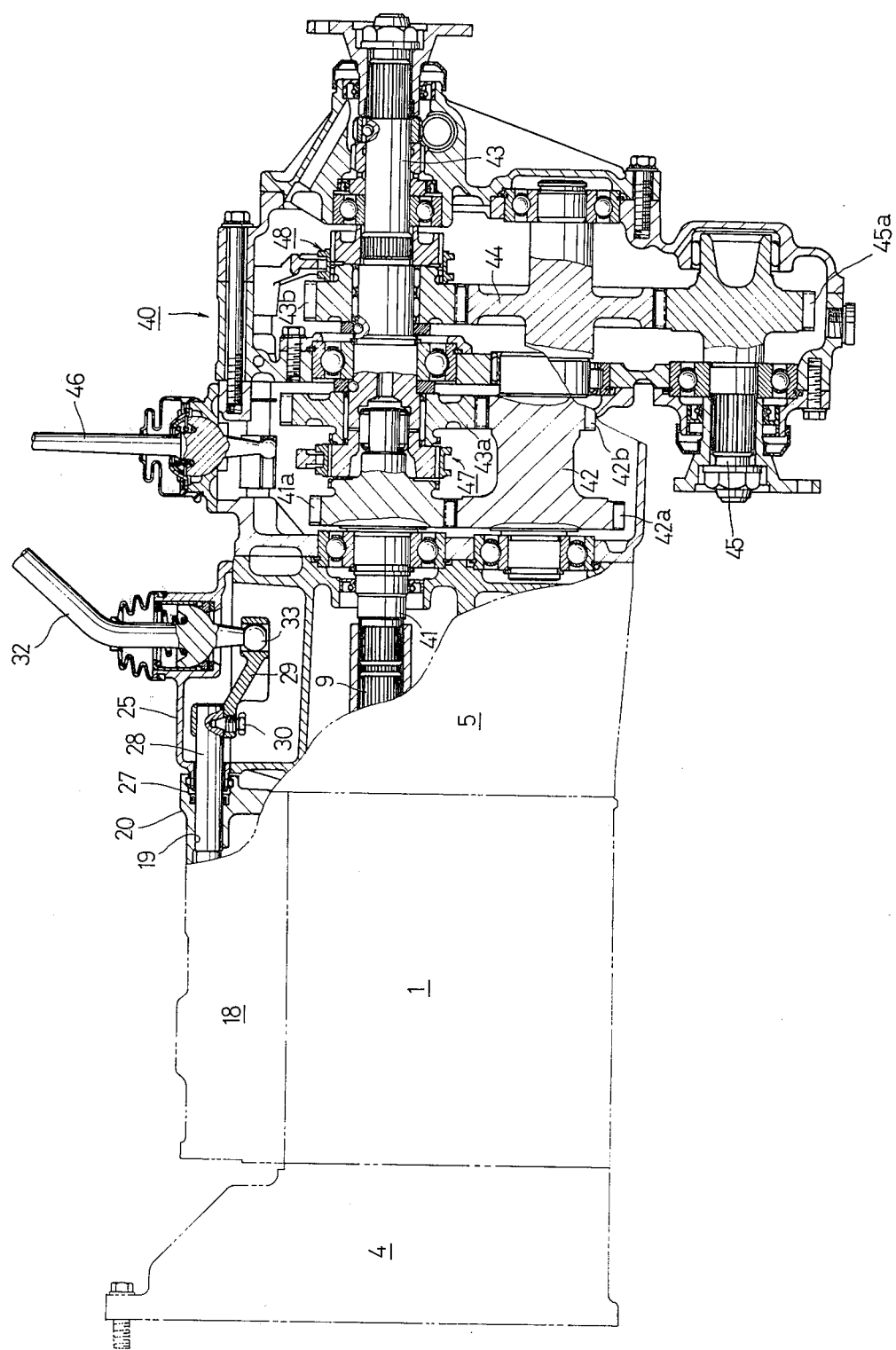
FIG. 6 is a partially fragmentary longitudinal sectional view of a manual transmission provided with a power distributor.

Attention is now drawn to FIG. 6 in which the fourth embodiment of the present invention applied to a transmission provided with a power distributor 40 changeable between two wheel drive type (rear wheel drive type) and four wheel drive type is shown. The construction of the connecting portions 20 and 27 of the case cover 18 of the transmission case 1 and the shift lever retainer 25 of the extension housing 5 is identical with that of the first embodiment as shown in FIGS. 1 to 3. In this embodiment, however, the space in the longitudinal direction of the automobile is remarkably limited on account of provision of the power distributor 40. Therefore, the connecting portions 20 and 27 of the case cover 18 and the retainer 25 should be positioned as close as possible. In this embodiment, the connecting portions 20 and 27 are overlapped with each other with interposition of the sealing member 23 to save the space in the longitudinal direction of the automobile while maintaining effective dust sealing function. Such construction is considered most appropriate for a manual transmission employing the power distributor 40.

The power distributor 40 is connected to the output shaft 9 of the transmission for power transmission and includes an input shaft 41 which has a drive gear 41a which is always engaged with a large-diametrical gear 42a of a counter shaft 42. The counter shaft 42 has a small-diametrical gear 42b which is always engaged with a driven gear 43a rotatably provided on a rear wheel output shaft 43 for transmitting power to the rear wheels of the automobile. Further, a drive gear 43b which is always engaged with an idler gear 44 is rotatably mounted on the output shaft 43. A front wheel output shaft 45 for transmitting power to the front wheels of the automobile has a gear 45a which is always engaged with the idler gear 44.

On the rear wheel output shaft 43, there are provided a pair of clutch mechanisms 47 and 48 of constant-mesh type which are simultaneously or individually driven to be changed by a transfer lever 46 of the power distributor 40. One clutch mechanism 47 is constructed to be in a neutral position intercepting power transmission between the input shaft 41 and the rear wheel output shaft 43, in high-speed shift directly connecting the input shaft 41 and the output shaft 43 or in low-speed shift connecting the output shaft 43 and the driven gear 43a. The other clutch mechanism 48 is constructed to be in rear wheel drive shift intercepting power transmission between the output shaft 43 and the drive gear 43b or four-wheel drive shift connecting the output shaft 43 and the drive gear 43b.

While the invention has been described with reference to a few preferred embodiments thereof, it is to be understood that modifications or variations may be easily made without departing from the scope of this invention which is defined by the appended claims.

What is claimed is:

1. In combination with a manual transmission for an automobile having a transmission case, an extension housing, a case cover mounted to said transmission case for covering the upper open portion thereof, a shift lever retainer shiftably and selectively supporting a shift lever and mounted on the upper surface of said extension housing and a shift lever shaft extending along said case cover and said shift lever retainer for transmitting operation of said shift lever to said transmission, a sealing device provided between said case cover and said shift lever retainer, said device comprising cylindrical connecting portions respectively formed in said case cover and said shift lever retainer and penetrated by said shift lever shaft for being connected with each other by insertion with interposition of a sealing member between the inner periphery of one of said connecting portions and the outer periphery of the other.

2. The invention as defined in claim 1 wherein said connecting portion of said case cover is made large in diameter for receiving said connecting portion of said shift lever retainer.

3. The invention as defined in claim 1 wherein said connecting portion of said shift lever retainer is made large in diameter for receiving said connecting portion of said case cover.

4. The invention as defined in claim 2 further including a shift lever housing, and wherein the diameter of said connecting portion of said shift lever retainer is sized to be penetrated by said shift lever housing.

5. The invention as defined in claim 3 further including a shift lever housing, and wherein the diameter of said connecting portion of said shift lever retainer is sized to be penetrated by said shift lever housing.

6. The invention as defined in claim 1 wherein said manual transmission is applied to a four-wheel drive type automobile.

7. The invention as defined in claim 1 wherein said sealing member is an O-ring inserted into an annular groove provided in one of said connecting portions.

* * * * *